United States Patent [19]

Murphy

[11] Patent Number: 5,391,078
[45] Date of Patent: Feb. 21, 1995

[54] SYMBOLIC LANGUAGE TEACHING AND COMMUNICATIONS SYSTEM UTILIZING TACTILE PATTERN DISCRIMINATION

[76] Inventor: Kevin Murphy, 97 Forrest St., Plaistow, N.H. 03865

[21] Appl. No.: 74,795

[22] Filed: Jun. 10, 1993

[51] Int. Cl.⁶ ............................................. G09B 21/02
[52] U.S. Cl. ................................................... 434/113
[58] Field of Search ............... 434/112, 113, 115, 117, 434/403, 171, 172; 446/128

[56] References Cited

U.S. PATENT DOCUMENTS

| | | | |
|---|---|---|---|
| 910,330 | 1/1909 | Wait . | |
| 4,037,200 | 7/1977 | Cranmer | 340/166 |
| 4,715,743 | 12/1987 | Schmanski | 404/9 |
| 4,880,384 | 11/1989 | Murphy | 434/113 |
| 5,161,975 | 11/1992 | Andrews | 434/113 |
| 5,275,567 | 1/1994 | Whitfield | 434/113 |

*Primary Examiner*—Gene Mancene
*Assistant Examiner*—Jeffrey A. Smith
*Attorney, Agent, or Firm*—Daniel J. Bourque; Anthony G. M. Davis; Michael Bujold

[57] ABSTRACT

A symbolic language teaching and communication system is disclosed which includes at least one block having a pattern of raised protrusions with rounded top surfaces for tactile discrimination. Each pattern represents an alpha-numeric character for recognition by a visually impaired individual, and the block has indicia on one of the sides corresponding to the alpha-numeric character for recognition by a non-visually impaired individual. Each block also has a curved region on one of the corners of the block to provide for the proper orientation of the block on a block retaining slate when forming words or sentences with a plurality of blocks. The block retaining slate also has a rounded corner to provide for the proper orientation of the block retaining slate when forming or reading words or sentences on the block retaining slate. The blocks are removably engaged with the block retaining slate by protrusions which are frictionally engaged with protrusions on the block retaining slate. The block retaining slate has a triangular portion between the engaging members to provide for proper alignment and spacing of the blocks on the retaining slate. The triangular portion can be formed as columns or as rows on the block retaining slate depending upon the language which is being used. The back side of the block retaining slate may be adapted to be placed proximate another surface or removably attached to another surface by providing either a felt region, a rubber region, a magnetic region or a hook/pile coupling region.

20 Claims, 5 Drawing Sheets

SYMBOLIC LANGUAGE TEACHING AND COMMUNICATIONS SYSTEM UTILIZING TACTILE PATTERN DISCRIMINATION

FIELD OF THE INVENTION

This invention relates to a teaching and communications system for a symbolic language which utilizes tactile or touch pattern discrimination, such as Braille, and more particularly, to such a system including individual blocks and a block retaining member or slate for facilitating both the teaching of a symbolic language to disabled individuals such as the visually impaired, as well as for facilitating communication between such disabled individuals and non-visually impaired individuals.

BACKGROUND OF THE INVENTION

Prior art devices have been invented which teach Braille letters, words, and sentence structure to the visually impaired. U.S. Pat. No. 4,880,384 by the inventor of the present invention shows one such device which is a predecessor to the present invention. The inventor's prior Patent discloses building blocks having raised dots representing Braille characters which can be arranged on a board to create words or sentences. The prior art apparatus, while useful for teaching the visually impaired, has many deficiencies.

In the prior art, the shape of the Braille blocks having four sides and four corners allows for the blocks to be placed in more than one orientation on the board. The blocks in the prior art do not provide a way for the visually impaired to properly orient blocks on the board.

Second, the shape of the board on which the blocks are placed also does not provide for orientation of the board. It is essential that a visually impaired person can properly orient the board to read the word or sentence formed by the Braille blocks.

Third, the Braille teaching apparatus shown in the prior art does not provide for a way to space the blocks for easy alignment to form words or sentences. The Braille blocks are attached to protrusions on the board. The protrusions form a regular pattern on the board, and the blocks can easily be misaligned when placed together to form words or sentences.

Fourth, the Braille blocks in the prior art apparatus do not provide for visual indication to allow communication with non-visually impaired, i.e. parents, brothers, sisters, etc. In using the prior art apparatus, the non-visually impaired who do not know how to read Braille would not be able to read the words or sentences formed with the Braille blocks.

Fifth, the prior art apparatus also provides for use only in teaching Braille letters, words and sentence structure. The prior art does not provide for a way to use the apparatus to communicate in other contexts such as a message board or a refrigerator board.

Additionally, the prior art block patterns of raised protrusions are difficult to tactilly discriminate given their flat top surface. Accordingly, what is needed is the modified symbolic language teaching and communication system of the present invention. The shape of the blocks is modified to allow for easy orientation on a block engaging slate which also has a modified shape for orientation. The blocks are also provided with indicia so that they may be read by someone who is not visually impaired and include protrusions with rounded top portions. Further, in addition to being used as a Braille teaching apparatus, the slate can be mounted to different surfaces to communicate messages to others in any symbolic language using tactile pattern discrimination.

SUMMARY OF THE INVENTION

The present invention is a symbolic language teaching and communication system which uses tactile pattern discrimination to teach and communicate messages to disabled individuals, such as the visually impaired. The system includes a tactile recognition teaching and communication block having a generally rectangular shape including four sides, a top surface, and a bottom region. The top surface of the block includes a plurality of raised protrusions arranged in a predetermined pattern corresponding to a predetermined alpha-numeric character of a selected symbolic language when the block is orientated in a predetermined direction. Each raised protrusion has a rounded top surface region so that a user can easily tactily discriminate the predetermined pattern and recognize the predetermined alpha-numeric character. In the preferred embodiment, the predetermined pattern or symbolic language formed by the raised protrusions corresponds to a Braille alpha-numeric character.

The block also includes a tactily recognizable deviation formed at an intersection between the top surface and first and second sides of the block for facilitating the orientation of the block in a predetermined direction on a surface area by a visually impaired user. In the preferred embodiment, the tactily 4 recognizable deviation includes a curved region disposed on a portion of one corner region of the block or extending along an entire corner region of the block from the top surface to the bottom region. In one embodiment, the curved region is disposed on an upper left hand corner of the block for using the block to form words and sentences in a language which reads from left to right. In another embodiment, the curved region is located on an upper right hand corner of the block for using the block in a language which reads from right to left.

The block also includes a visually discernable alpha-numeric indicia on one side of the block which corresponds to the predetermined alpha-numeric character formed by the raised protrusions on the top surface. The indicia provides visual discrimination of the predetermined pattern for a non-visually impaired user so that the non-visually impaired user can communicate with the visually impaired user.

The bottom region of the block includes at least one engaging member for removably attaching the block to an adjacent surface so that a plurality of blocks can be arranged to form a word, phrase or sentence. In one embodiment, the engaging members can be receptacles which are adapted to frictionally engage protrusions on the adjacent surface. Other embodiments include a magnetic region or a hook/pile coupling region on the bottom region of the blocks for engaging a corresponding region on the adjacent surface or slate.

In the preferred embodiment, the adjacent surface on which the blocks are positioned includes a block retaining slate having block engaging members on a first surface of the block retaining slate adapted to engage block retaining slate engaging members on the bottom region of the blocks.

In one embodiment, the block engaging members on the block retaining slate include a plurality of protrusions from the surface area of the block retaining slate adapted to frictionally engage with mating receptacles on the bottom region of each block. The block engaging members are disposed in a predefined pattern on the surface area of the block retaining slate including either a predetermined number of rows or a predetermined number of columns of block engaging members.

Each predefined pattern of block engaging members is separated by a respective row spaced area or column spaced area on which there is no block engaging member on the surface of the block retaining slate. In the preferred embodiment, the row spaced area or column spaced area includes a triangular shaped row or a triangular shaped column, respectively, to facilitate the alignment and spacing of a plurality of blocks on the block retaining slate.

The block retaining slate also includes a second surface having either a magnetic region, a felt region, a rubber region, a hook/pile material coupling region, or other similar region for facilitating the placement of the block engaging slate proximate another surface, such as a table, wall, or a refrigerator. The block retaining slate also has a tactilly recognizable deviation for properly orientating the block retaining slate by a visually impaired user. In the preferred embodiment, the tactilly recognizable deviation includes a rounded corner region on the block engaging slate.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 1:
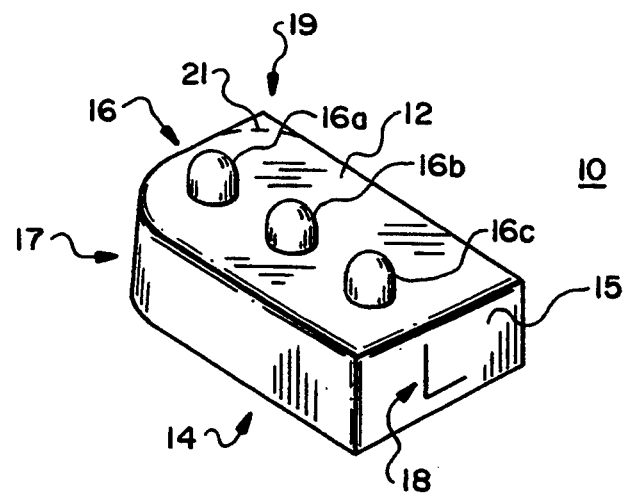
FIG. 1 is a perspective illustration of a block having a curved region along an entire corner of the block according to a first embodiment of the present invention.

A symbolic language tactile recognition teaching and communication system according to the present invention includes one or more blocks 10, FIG. 1. Each block 10 is generally rectangular in shape and has a top surface 12 and a bottom region 14. The bottom region 14 is adapted to be removably attached to a surface area which is described in greater detail below.

The top surface 12 of each block 10 includes raised protrusions 16 which are tactilly recognizable (by touch or feel) to a visually impaired person. The raised protrusions 16a, 16b, 16c are arranged in a predetermined pattern to represent an alpha-numeric character which can be used to form words, sentences, or other representations in a symbolic language. The arrangement of raised protrusions 16a, 16b, 16c in FIG. 1 represents the letter L in Braille, but many arrangements of raised protrusions are possible to form letters and numbers of other symbolic languages.

In the preferred embodiment, the raised protrusions 16 are cylindrically shaped and have a rounded top. This design increases the sensitivity to touch so that a visually impaired person can more easily tactilly recognize the words, sentences, and other alpha-numeric representations written in a symbolic language using the blocks 10.

The block 10 further includes indicia 18 on one or more sides 15 of the block which corresponds to the alpha-numeric character represented by the arrangement of raised protrusions 16. For example, in FIG. 1 the letter L indicates to a non-visually impaired person that the protrusions 16a, 16b, 16c represent that letter. Thus, a nonvisually impaired person who is not familiar with the symbolic language can easily use the blocks to teach the symbolic language to or otherwise communicate with a visually impaired person. The indicia can also be numbers or letters of a language other than English for teaching or communicating in that language.

The block 10 further includes a tactilly recognizable deviation 17 which is preferably located along a corner of the block where two side surfaces intercept. The tactilly recognizable deviation enables a visually impaired user of the blocks to properly orient the blocks on a surface area when forming words or sentences with the blocks 10.

The tactilly recognizable deviation may be formed by a curved region 17 extending along an entire left hand corner of the block 10 from the top surface 12 to the bottom region 14. Alternatively, this curved region could be formed on a right hand corner 19 of the block 10, as shown by dashed line 21. Having the curved region on the right hand side is useful when the visually impaired user must properly orient blocks 10 to form words or sentences in a language which reads from right to left.

Figure 2:
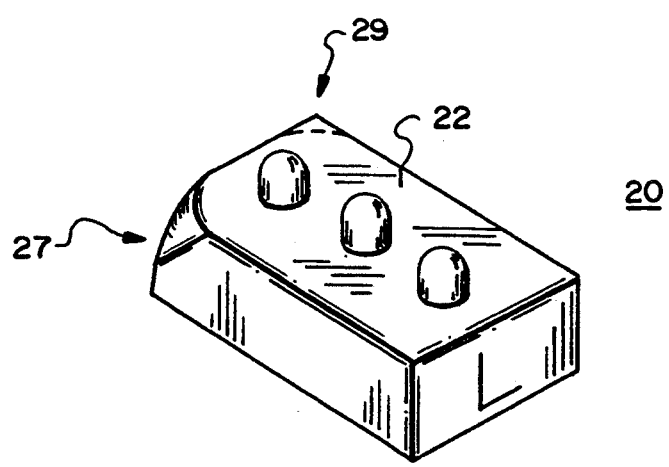
FIG. 2 is a perspective illustration of a block having a curved region on an upper left hand corner of the block according to a second embodiment of the present invention.

Another embodiment of the block of the present invention is shown in FIG. 2 and includes a tactilly recognizable deviation formed by a curved region 27 on an upper corner of the block 20. The curved region 27 extends along the top half of an intersection of two side surfaces to the top surface 22 of block 20. This embodiment may also include a tactily recognizable division formed on the upper right hand corner 29 of the block for languages which read from right to left.

Figure 3A:
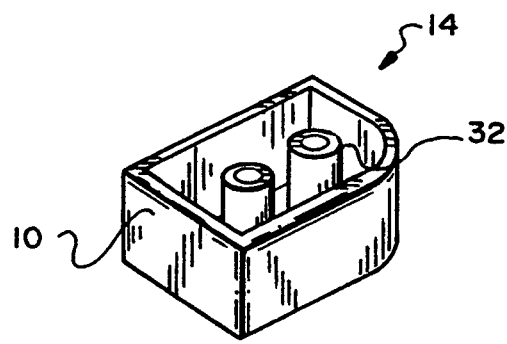
FIG. 3a is a perspective illustration of a block showing the bottom region according to one embodiment of the invention.
Figure 3B:
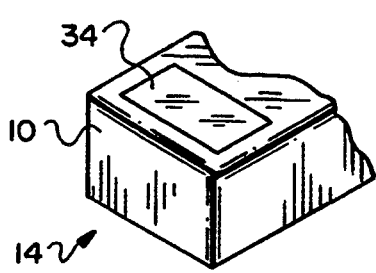
FIG. 3b is a perspective illustration of a block showing the bottom region according to a second embodiment of the invention.

The bottom region 14 of the block 10 is shown in FIGS. 3A and 3B. The bottom region 14 of each block includes engaging members adapted to be removably attached to a surface area so that a plurality of blocks 10 can be arranged together to form words and sentences on that surface area. In one embodiment shown in Fig. 3A, the engaging members on the bottom region 14 are protrusions 32 having receptacles which are adapted to be engaged in a friction fit with protrusions on the surface area of an adjacent member. This embodiment is disclosed in U.S. Pat. No. 4,880,384 incorporated herein by reference.

Figure 3C:
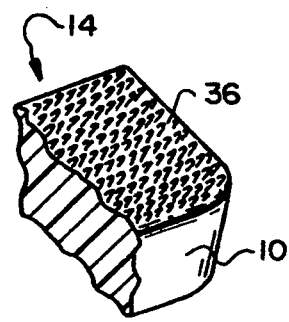
FIG. 3C is a perspective view of a block showing the bottom region according to a third embodiment of the invention.

Other possible embodiments for removably attaching the block 10 to a surface area include but are not limited to, a magnetic region 34, FIG. 3B, or hook/pile coupling region 36, FIG. 3C, such as VELCRO ®. Some possible surface areas include, but are not limited to desks, blackboards, bulletin boards, refrigerators, or other wall surfaces in the home, classroom, or work place.

Figure 4:
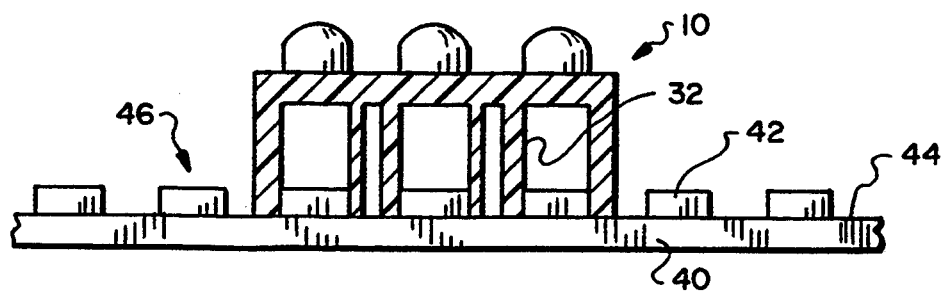
FIG. 4 is a cross-sectional illustration of the present invention showing one of the blocks removably attached to the block retaining slate.

In the preferred embodiment, the surface area on which the blocks are removably attached is formed by a block retaining slate 40, FIG. 4, having block engaging members 46 on a top surface 44. One embodiment of the block engaging members 46 are protrusions 42 extending from the top surface 44 of the block retaining slate 40. The protrusions 42 are adapted to frictionally engage the bottom region of blocks 10 of the one embodiment disclosed above where the engaging members on the block 10 are protrusions 32. Alternative embodiments of the block retaining slate 40 include, but are not limited to a magnetic region or a hook/pile coupling region on the top surface 34 of the block retaining slate 44 engaging corresponding engaging members on the bottom region 14 of a block 10.

Figure 5:
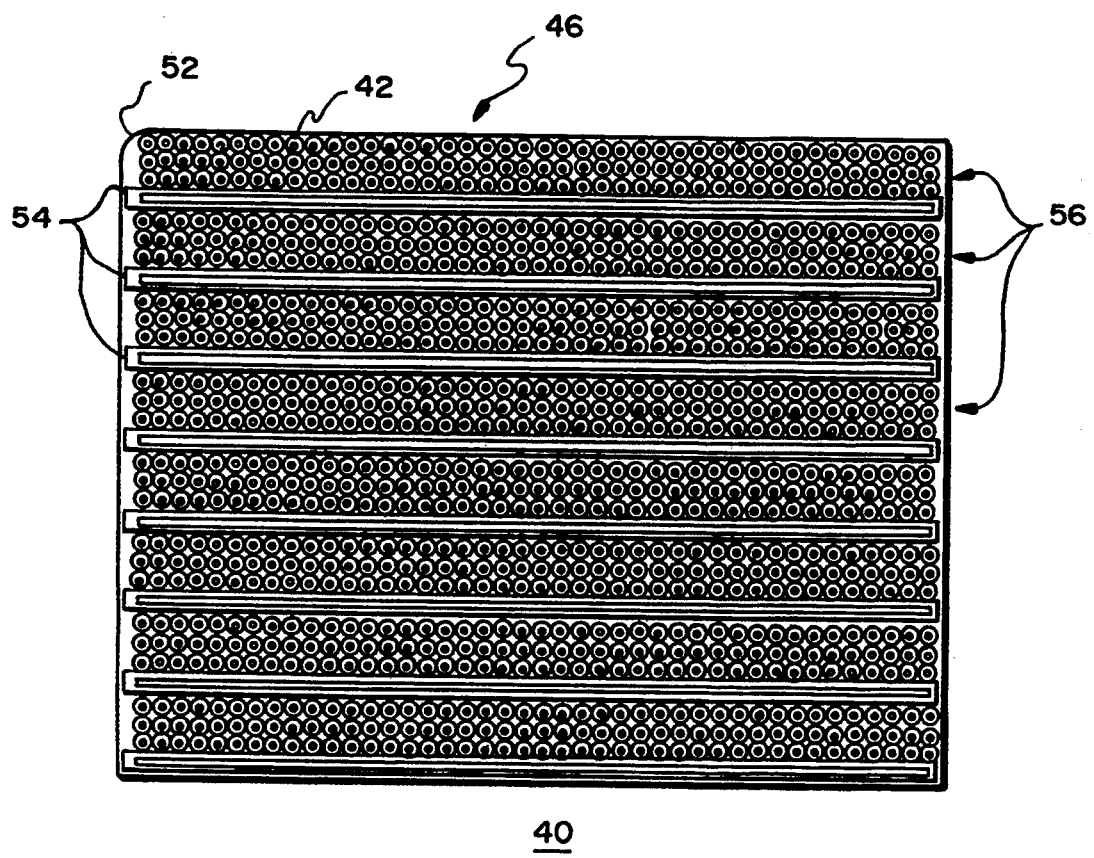
FIG. 5 is a top view of a block retaining slate having a rounded corner according to the present invention.

The block engaging members 46, FIG. 5, on the block retaining slate 40 are disposed in a predefined pattern on the top surface 44 of the block retaining slate 40. Each predefined pattern is separated by a spaced area 54 which allows the blocks 10 to be properly spaced and aligned on the block retaining slate 40. In this embodiment, the predetermined pattern includes a predetermined number of rows 56, and each spaced area 54 is formed as a row extending along the top surface 44 of the block retaining slate 40 between each row 56 of block engaging members. This embodiment is used to position blocks 10 to form words and sentences in symbolic languages which read from side to side, such as English.

Figure 7:
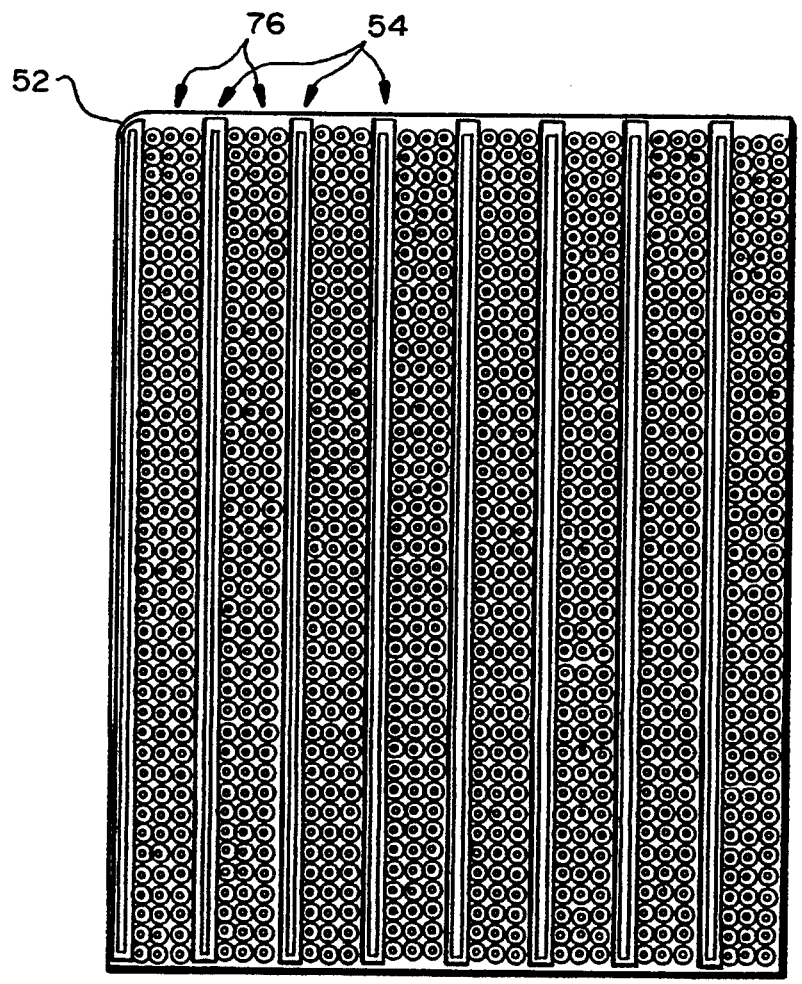
FIG. 7 is a top view of a block retaining slate having a columnar spaced area for reading the symbolic language from top to bottom according to another embodiment of the present invention.

In another embodiment shown in FIG. 7, the predefined pattern includes a predetermined number of columns 76, and the spaced area 54 is formed as a column which extends from top to bottom on the top surface 44 of the block retaining slate 40. The block retaining slate with a columnar spaced area 72 is used to form words and sentences in a language which reads from top to bottom, such as Chinese.

Figure 6A:
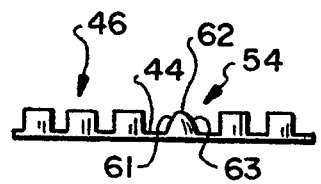
FIG. 6A is a side view of the block retaining slate having a spaced area which can be a triangular portion in one embodiment.
Figure 6B:
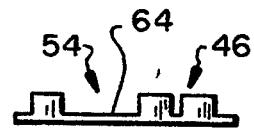
FIG. 6B is a side view of the block retaining slate having a spaced region according to another embodiment of the present invention.

The spaced area 54 may be formed as a space 64, FIG. 6B, where there is no block engaging member 46. In a preferred embodiment, however, the area 54 includes a triangular shaped member 62 extending from the top surface 44 of the block retaining slate 40, FIG. 6A. The triangular shape allows the blocks to easily be forced into proper alignment on the block retaining slate 40 when a side of a block 10 comes into contact with a one sloped surface 61, 63 of the triangular member 62.

The block retaining slate 40 according to one aspect of the present invention further includes a tactily recognizable deviation which is preferably a rounded corner 52, as shown in FIGS. 5 and 7. The rounded corner 52 allows a visually impaired person using the block retaining slate 40 to orient the block retaining slate 40 so that the message formed by an arrangement of blocks 10 can be properly read.

For example, the visually impaired user of the present system would know that the rounded corner should be located on the upper left hand side and can properly orient the block retaining slate 40 to prevent the message from being upside down. The orientation of the block retaining slate 40 is also essential to distinguish between languages which read from side to side and those which read from top to bottom, as mentioned above. Other locations of a tactilly recognizable deviation are possible provided the user knows where the tactilly recognizable deviation should be positioned.

Figure 8A:
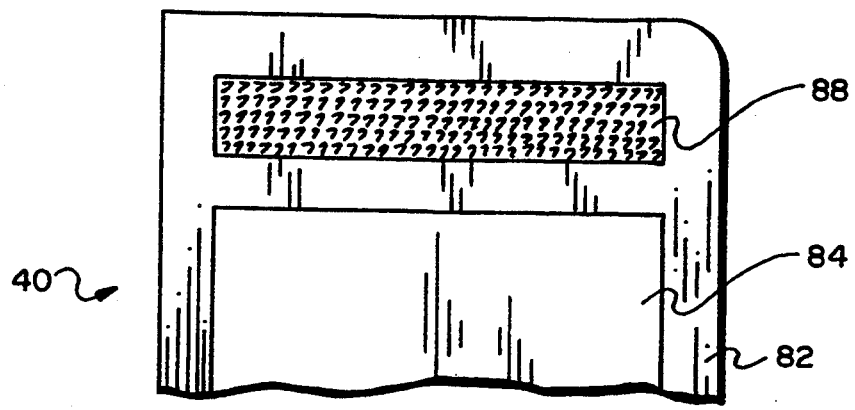
FIG. 8A is a back view of a block retaining slate having a surface which attaches to another surface according to one embodiment of the present invention.
Figure 8B:
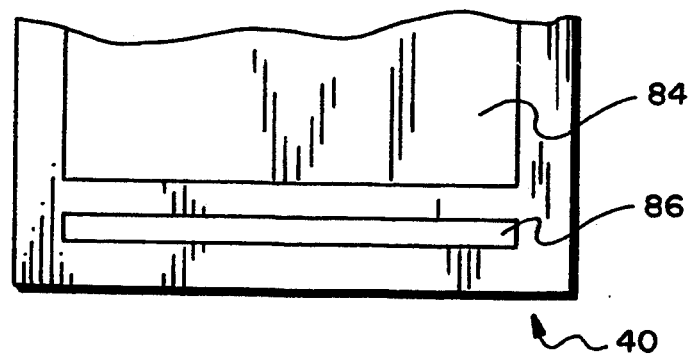
FIG. 8B is a side view of a block retaining slate having a surface for attaching to another surface according to another embodiment of the present invention.

The block retaining slate 40 further includes a back surface 82 shown in FIGS. 8A and 8B which is adapted to be positioned proximate another surface when using the teaching and communication system of the present invention. In one embodiment, the back surface 82 includes either a felt region or a rubber region 84 for supporting the block retaining slate 40 on a flat surface, such as a desk or table.

Another embodiment further includes a region on the back surface 82 which is adapted to be attached to a vertical surface, such as a wall or refrigerator. In this embodiment, the back surface of slate 40 includes a magnetic region 86, FIG. 8B, or a hook/pile coupling region 88, FIG. 8A, which attaches to a respective magnetic region or hook/pile coupling region on another surface. This allows the block retaining slate 40 to be attached to a vertical surface such as a refrigerator or a wall area next to a telephone so that the block retaining slate 40 can be used to communicate messages between a visually impaired individual and other visually impaired individuals or non-visually impaired individuals.

Accordingly, the present invention provides a symbolic language teaching and communications apparatus having blocks which are easier to use by both the visually impaired and the non-visually impaired to form words, sentences, or other alpha-numeric representations. The system of the present invention can not only be used to teach symbolic language to the visually impaired, but can be used as a message board for communicating messages between a visually impaired person and a non-visually impaired person.

Modifications and substitutions by one of ordinary skill in the art are considered to be within the scope of the present invention which is not to be limited except by the claims which follow.

I claim:

1. A tactile recognition language teaching and communication system, comprising:

at least one block having a generally rectangular shape including four sides, a top surface and a bottom region;

said top surface including a plurality of raised protrusions arranged in a predetermined pattern, said predetermined pattern corresponding to a predetermined alpha-numeric character when said at least one block is oriented in a predetermined direction, each of said plurality of raised protrusions having a rounded top surface region, for facilitating tactile discrimination of said predetermined pattern and thus, said predetermined alpha-numeric character by a user of said at least one block;

at least a portion of one corner region of said at least one block formed by an intersection between said top surface and first and second of said four sides including a tactily recognizable deviation, for facilitating said orientation in a predetermined direction of said at least one block on a surface area by a visually impaired user; and at least one of said four sides of said at least one block including visually discernable alpha-numeric indicia which corresponds to said predetermined alpha-numeric character formed by said plurality of raised protrusions on said top surface of said at least one block, for providing visual discrimination of said predetermined pattern and for facilitating communication between said visually impaired user and a non-visually impaired user.

2. The system of claim 1 wherein at least one predetermined patterned of said raised protrusions corresponds to a Braille alpha-numeric character.

3. The system of claim 1 wherein said bottom region of said at least one block includes at least one engaging member adapted to removably attach said at least one block to said surface area, for allowing a plurality of said blocks to be removably attached and arranged, in a predetermined order to form at least one of a word, phrase, sentence, and alpha-numeric representation.

4. The system of claim 3 wherein said at least one engaging member includes at least one of a magnetic region and a hook/pile region adapted to removably engage a corresponding engaging member on said surface area.

5. The system of claim 1, further including a block retaining slate, wherein a first surface of said block retaining slate includes said surface area, and said bottom region of said at least one block includes at least one block retaining slate engaging member, for removably attaching said at least one block to said block retaining slate, for allowing a plurality of said blocks to be removably attached and arranged, in a predetermined order in relationship to said block retaining slate, to form at least one of a word, phrase and sentence.

6. The system of claim 5 wherein said block retaining slate includes a plurality of block engaging members, said block engaging members adapted for mating with at least one of said block retaining slate engaging members of said bottom region of said at least one block;

said block engaging members disposed in a predefined pattern on said first surface of said block retaining slate, said predefined pattern including a predetermined number of at least one of rows and columns of block engaging members; and wherein said predetermined number of at least one of rows and columns of block engaging members are separated, respectively, by one of at least row spaced area and at least one column spaced area on which there is no block engaging member on said first surface of said block retaining slate, for facilitating the placement and spacing of said plurality of said blocks on said block retaining slate to form at least one of said word, phrase and sentence.

7. The system of claim 6 wherein said block engaging members of said block retaining slate includes a plurality of protrusions from said first surface of said block retaining slate.

8. The system of claim 6 wherein said block retaining slate includes a second surface; and wherein said second surface of said block retaining slate includes one of a magnetic region, a felt region, a rubber region, and a hook/pile material coupling region, for facilitating the placement of said block engaging slate proximate another surface.

9. The system of claim 6 wherein said block retaining slate further includes a tactily recognizable deviation, for facilitating proper orientation of said block retaining slate by a visually impaired user.

10. The system of claim 9 wherein said tactily recognizable deviation includes a rounded corner region on said block engaging slate.

11. The system of claim 6 wherein said at least one of at least one row spaced and at least one column spaced area on which there is no block engaging member on said first surface of said block retaining slate includes one of a triangular shaped row and a triangular shaped column, to facilitate alignment and spacing of a plurality of said blocks on said block retaining slate.

12. The system of claim 1 wherein said tactily recognizable deviation disposed on at least a portion of one corner region of said at least one block includes a curved region.

13. The system of claim 12 wherein said curved region extends along an entire corner region of said at least one block from said top surface to said bottom region of said at least one block.

14. The system of claim 12 wherein said curved region is disposed on an upper left hand corner of said at least one block, for use in a language read from left to right.

15. The system of claim 12 wherein said curved region is located on an upper right hand corner of said at least one block, for use in a language read from right to left.

16. A tactile communication system including a block retaining slate for use with tactile recognition teaching and communication blocks, comprising:

a plurality of block engaging members, said block engaging members adapted for mating with at least one block retaining slate engaging member on a bottom region of at least one block;

said block engaging members disposed in at least one predefined pattern on a first surface of said block retaining slate, said at least one predefined pattern including at least one of a predetermined number of rows and columns of said block engaging numbers; and wherein said at least one predefined pattern of block engaging members are separated, respectively, by one of at least one row surface area and at least one column surface area on which there is no block engaging member on said first surface of said block retaining slate for facilitating the placement and spacing of said block on said block retaining slate to form at least one of a word, phrase and sentence.

17. The block retaining state of claim 16, wherein said block engaging members of said block retaining slate includes a plurality of protrusions from said first surface of said block retaining slate.

18. The block retaining slate of claim 16, wherein said block retaining slate includes a second surface; and
    wherein said second surface of said block retaining slate includes one of a magnetic region, a felt region, a rubber region, and a hook/pile material coupling region, for facilitating the placement of said block engaging slate proximate another surface.

19. The block retaining slate of claim 16, wherein said block retaining slate further includes a tactily recognizable deviation, for facilitating proper orientation of said block retaining slate by a visually impaired user.

20. The block retaining slate of claim 19, wherein said tactily recognizable deviation includes a rounded corner region on said block engaging slate.

* * * * *